(12) United States Patent
Endo et al.

(10) Patent No.: US 8,315,784 B2
(45) Date of Patent: Nov. 20, 2012

(54) NAVIGATION DEVICE TRAFFIC INFORMATION RECEPTION METHOD

(75) Inventors: Yoshinori Endo, Kanagawa (JP); Shinichi Amaya, Kanagawa (JP)

(73) Assignee: Xanavi Informatics Corporation, Zama-shi (JP)

( * ) Notice: Subject to any disclaimer, the term of this patent is extended or adjusted under 35 U.S.C. 154(b) by 1007 days.

(21) Appl. No.: 11/815,118

(22) PCT Filed: Jan. 30, 2006

(86) PCT No.: PCT/JP2006/301486
§ 371 (c)(1),
(2), (4) Date: Jul. 31, 2007

(87) PCT Pub. No.: WO2006/080511
PCT Pub. Date: Aug. 3, 2006

(65) Prior Publication Data
US 2009/0043499 A1    Feb. 12, 2009

(30) Foreign Application Priority Data

Jan. 31, 2005  (JP) ................................ 2005-022756

(51) Int. Cl.
*G06F 19/00* (2011.01)
(52) U.S. Cl. ........ 701/117; 701/118; 701/119; 701/120; 701/408; 340/905; 340/907; 340/995.13; 340/995.19

(58) Field of Classification Search .................. 701/209, 701/210, 117, 118, 119, 120, 408, 414; 455/414.3; 340/995.13, 995.19, 905, 907
See application file for complete search history.

(56) References Cited

U.S. PATENT DOCUMENTS

| | | | | |
|---|---|---|---|---|
| 6,873,905 | B2 * | 3/2005 | Endo et al. ..................... | 701/416 |
| 7,636,630 | B2 * | 12/2009 | Fushiki et al. ................ | 701/423 |
| 7,657,370 | B2 * | 2/2010 | Nagase et al. ................ | 701/465 |
| 2004/0225437 | A1 | 11/2004 | Endo et al. | |
| 2005/0021223 | A1 * | 1/2005 | Heaps et al. .................. | 701/200 |
| 2005/0043880 | A1 | 2/2005 | Yamane et al. | |
| 2009/0043499 | A1 * | 2/2009 | Endo et al. .................... | 701/210 |

FOREIGN PATENT DOCUMENTS

| | | |
|---|---|---|
| CN | 1517680 | 8/2004 |
| CN | 1536514 | 10/2004 |
| JP | 2002-319090 | 10/2002 |
| JP | 2003-294469 | 10/2003 |
| JP | 2004-280320 | 10/2004 |
| JP | 2005-017151 | 1/2005 |

\* cited by examiner

*Primary Examiner* — Redhwan k Mawari
(74) *Attorney, Agent, or Firm* — Crowell & Moring LLP

(57) ABSTRACT

Predicted traffic information of a plurality of time bands is downloaded once for a mesh area. Moreover, time band range of the predicted traffic information to be downloaded is increased as distance from current position to the mesh area increases. Furthermore, the time band range is increased for the morning and the evening. Moreover, as difference between the current time and departure time becomes larger, the time band range is increased.

7 Claims, 16 Drawing Sheets

FIG. 6

TIME BAND RANGE TABLE 350

| TIME BAND RANGE ID | TIME PERIOD BEFORE REFERENCE TIME | TIME PERIOD AFTER REFERENCE TIME |
|---|---|---|
| a | 0.5 HOURS | 0.5 HOURS |
| b | 1.0 HOURS | 1.0 HOURS |
| c | 1.5 HOURS | 1.5 HOURS |
| d | 2.0 HOURS | 2.0 HOURS |
| e | 2.5 HOURS | 2.5 HOURS |
| f | 3.0 HOURS | 3.0 HOURS |
| ⋮ | ⋮ | ⋮ |

FIG. 7

TIME BAND RANGE DECISION TABLE 360

| DISTANCE FROM CURRENT POSITION (km) | TIME BAND RANGE ID |
|---|---|
| 0~15 | a |
| ~30 | b |
| ~45 | c |
| ~60 | d |
| ~75 | e |
| ~90 | f |
| ⋮ | ⋮ |

FIG. 8

TIME BAND RANGE DECISION TABLE 370

| DATE & TIME | TIME BAND RANGE ID |
|---|---|
| MIDNIGHT(23:00-3:00) | a |
| EARLY MORNING(3:00-5:00) | a |
| MORNING(5:00-9:00) | d |
| DAYTIME(9:00-16:00) | b |
| EVENING(16:00-23:00) | d |

TIME BAND RANGE DECISION TABLE 375

| AREA | TIME BAND RANGE ID |
|---|---|
| URBAN | d |
| RURAL | b |
| ⋮ | ⋮ |

TIME BAND RANGE DECISION TABLE 380

| DIFFERENCE BETWEEN CURRENT TIME AND DEPARTURE TIME (DESIRED ARRIVAL TIME) 381 | TIME BAND RANGE ID 382 |
|---|---|
| 0~0.5 HOURS | b |
| ~1.0 HOURS | c |
| ~1.5 HOURS | d |
| ~2.0 HOURS | e |
| ~2.5 HOURS | f |
| ⋮ | |

FIG. 11

TIME BAND RANGE DECISION TABLE 385

| SEARCH CONDITION 386 | TIME BAND RANGE ID 387 |
|---|---|
| TOLL ROAD PRIORITY | b |
| GENERAL ROAD PRIORITY | c |
| ⋮ | ⋮ |

DOWNLOAD REQUEST INFORMATION 390

| MESH ID | TIME RANGE |
|---|---|
| * * * | 9:45-11:45 |
| * * * | 10:45-12:45 |
| ⋮ | ⋮ |

HEAP TABLE

| CANDIDATE LINK ID | TRAVEL TIME | CONNECTION SOURCE LINK ID | TOTAL TRAVEL TIME | EXTRACTION FLAG |
|---|---|---|---|---|
| ***** | 5 | **** | 30 | NOT SET |
| ***** | 5 | **** | 25 | NOT SET |
| ***** | 10 | **** | 35 | NOT SET |
| ⋮ | ⋮ | ⋮ | ⋮ | ⋮ |
| ***** | 10 | **** | 10 | SET |

4301  4302  4303  4304  4306  4300

TIME BAND RANGE TABLE 355

| TIME BAND RANGE ID | TIME PERIOD BEFORE REFERENCE TIME | TIME PERIOD AFTER REFERENCE TIME |
|---|---|---|
| a | 0.5 HOURS | 0.8 HOURS |
| b | 1.0 HOURS | 1.3 HOURS |
| c | 1.5 HOURS | 1.8 HOURS |
| d | 2.0 HOURS | 2.3 HOURS |
| e | 2.0 HOURS | 2.3 HOURS |
| f | 3.0 HOURS | 3.3 HOURS |

356, 357, 358

NAVIGATION DEVICE TRAFFIC INFORMATION RECEPTION METHOD

TECHNICAL FIELD

The present invention relates to a navigation device, and more particularly, it relates to a traffic information downloading method in an in-vehicle type navigation device.

BACKGROUND ART

Patent Document 1 discloses an in-vehicle type navigation device that conducts a route search utilizing predicted traffic information. The predicted traffic information indicates traffic information on and after the current clock time, which has been generated from past traffic information and current traffic information. This in-vehicle type navigation device downloads the predicted traffic information from a server, and uses the downloaded information for searching a route.
Patent Document 1
Japanese Patent Laid-open Publication No. 2004-280320

DISCLOSURE OF INVENTION

Problems to be Solved by the Invention

Predicted traffic information is updated on the server side. Therefore, in order to search a route according to the real situation, it is preferable that the latest predicted traffic information be downloaded to the navigation device. However, if the entire predicted traffic information is constantly downloaded, there may be a large volume of communication traffic. The predicted traffic information that is not used by the navigation process including the route search is unnecessary. On the other hand, if the downloading is carried out every time the predicted traffic information becomes necessary in route searching, a longer response time is required in the route searching.

An object of the present invention is to download the predicted traffic information efficiently through a simple process. More specifically, the predicted traffic information is narrowed down to a range having a high possibility to be used in the navigation process (for example, route searching), and then this narrowed-down information is downloaded.

Means to Solve the Problem

In order to solve the problems as described above, the navigation device according to the present invention downloads the predicted traffic information corresponding to multiple time bands, from a server system holding the predicted traffic information that is managed by time band.

By way of example, the navigation device according to the present invention downloads the predicted traffic information corresponding to multiple time bands for one mesh area, from the traffic information distribution server system. This server system stores the predicted traffic information representing traffic information for every mesh area that is a partitioned area on a map, and for every time band after the current time.

The navigation device may change a time band range of the predicted traffic information to be downloaded, depending on distance from the current position. It is further possible to change the time band range of the predicted traffic information to be downloaded depending on the time and date. It is further possible to change the time band range of the predicted traffic information to be downloaded depending on an area to which the mesh belongs. It is further possible to change the time band range of the predicted traffic information to be downloaded depending on magnitude of difference between the downloading time and a scheduled departure time. It is further possible to change the time band range of the predicted traffic information to be downloaded depending on magnitude of difference between the downloading time and a scheduled arrival time.

BRIEF DESCRIPTION OF DRAWINGS

FIG. 6 is a configuration example of a time band range table;
FIG. 7 is a configuration example of a time band range decision table;
FIG. 8 is a configuration example of a time band range decision table;
FIG. 9 is a configuration example of a time band range decision table;
FIG. 10 is a configuration example of a time band range decision table;
FIG. 11 is a configuration example of a time band range decision table.

DENOTATION OF REFERENCE NUMERALS

100 . . . IN-VEHICLE TYPE NAVIGATION DEVICE, 200 . . . TRAFFIC INFORMATION DISTRIBUTION SERVER, 400 . . . NETWORK, 1 . . . ARITHMETIC PROCESSING UNIT, 2 . . . DISPLAY, 3 . . . STORAGE DEVICE, 4 . . . AUDIO I/O UNIT, 5 . . . INPUT UNIT, 6 . . . WHEEL SPEED SENSOR, 7 . . . GEOMAGNETIC SENSOR, 8 . . . GYRO, 9 . . . GPS RECEIVER, 11 . . . IN-VEHICLE LAN UNIT, 12 . . . FM MULTIPLEX BROADCASTING

RECEIVER, 13 . . . BEACON RECEIVER, 14 . . . NETWORK COMMUNICATION UNIT, 21 . . . CPU, 22 . . . RAM, 23 . . . ROM, 24 . . . DMA, 25 . . . DRAWING CONTROLLER, 26 . . . VRAM, 27 . . . COLORPALETTE, 28 . . . A/D CONVERTER, 29 . . . SCI, 30 . . . PIO, 31 . . . COUNTER, 41 . . . USER OPERATION ANALYZER, 42 . . . ROUTE SEARCHING SECTION, 43 . . . ROUTE STORAGE UNIT, 44 . . . ROUTE GUIDING SECTION, 45 . . . DISPLAY PROCESSOR, 46 . . . CURRENT POSITION CALCULATOR, 47 . . . COMMUNICATION PROCESSOR, 48 . . . RECEIVED INFORMATION STORAGE UNIT

BEST MODE FOR CARRYING OUT THE INVENTION

Hereinafter, an embodiment of the present invention will be explained with reference to the accompanying drawings.

Figure 1:
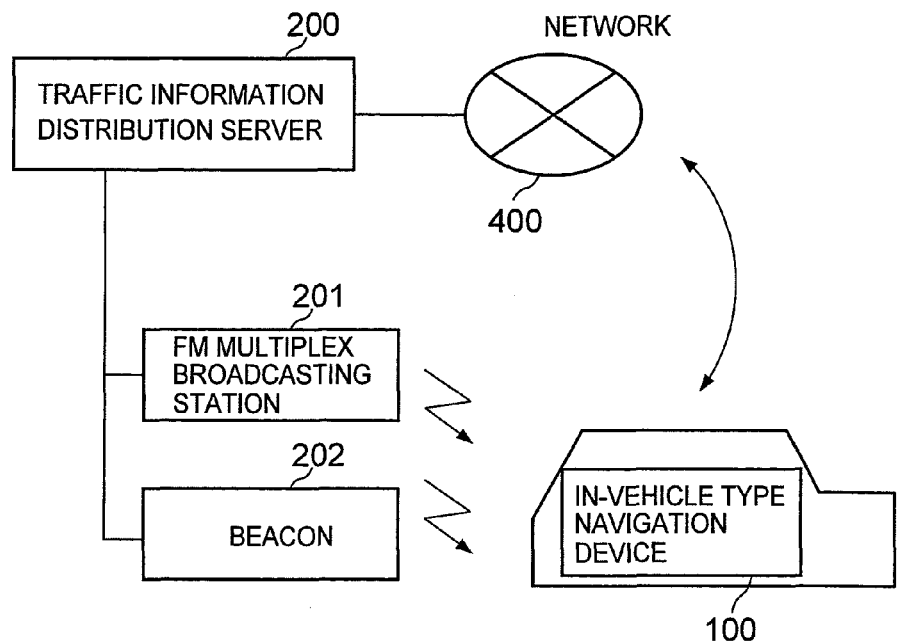
FIG. 1 is a schematic configuration diagram showing a navigation system relating to an embodiment of the present invention.

FIG. 1 is a schematic configuration diagram showing a navigation system relating to an embodiment of the present invention. As illustrated, the navigation system according to the present embodiment includes an in-vehicle type navigation device 100 and a traffic information distribution server 200. The in-vehicle type navigation 100 and the traffic information distribution server 200 are connected via a wireless communication base station (not illustrated) and a network 400. Furthermore, traffic information from the traffic information distribution server 200 is transmitted to the in-vehicle type navigation device 100, also by way of an FM multiplex broadcasting station 201 and a beacon 202.

The traffic information distribution server 200 is a server device that distributes traffic information to the in-vehicle type navigation device 100. The traffic information distribution server 200 holds current traffic information and predicted traffic information 210 in its own storage unit. The current traffic information is traffic information that includes current link travel time and degree of traffic congestion.

The predicted traffic information 210 is future traffic information on and after the current time. For example, the predicted traffic information 210 may be generated from the past traffic information and the current traffic information.

Figure 2:
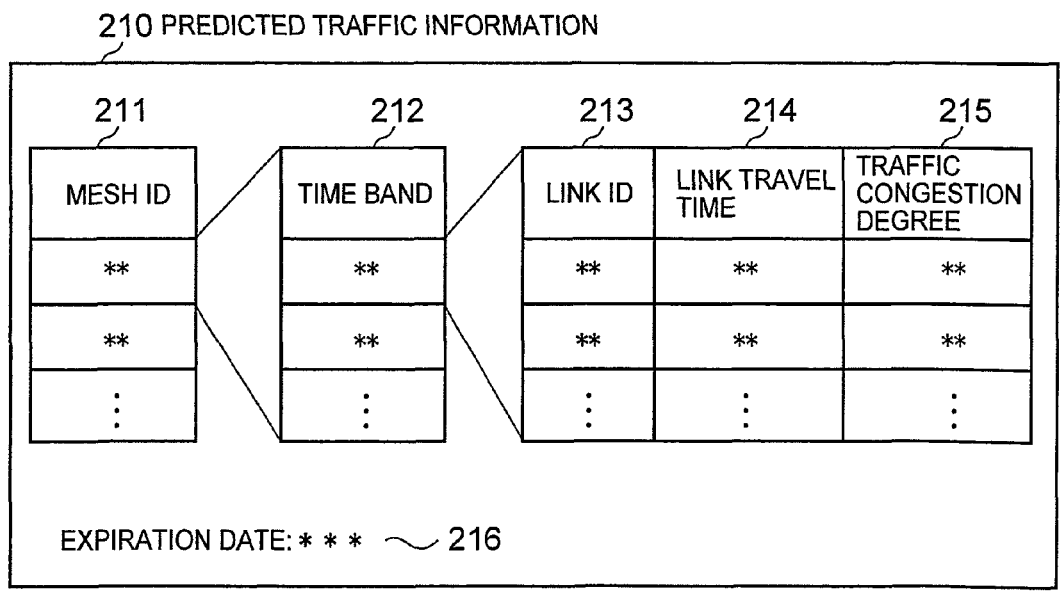
FIG. 2 illustrates a configuration example of predicted traffic information.

FIG. 2 is a configuration example of the predicted traffic information 210. The predicted traffic information 210 includes an identification code (mesh ID) 211 of a mesh area being a partitioned area on a map, a travel time 214 of a link belonging to the mesh, and a traffic congestion degree 215. The link travel time 214 is stored with respect to each identification code (link ID) 213 of the link. In addition, the predicted traffic information 210 includes its expiration date 216.

Figure 3:
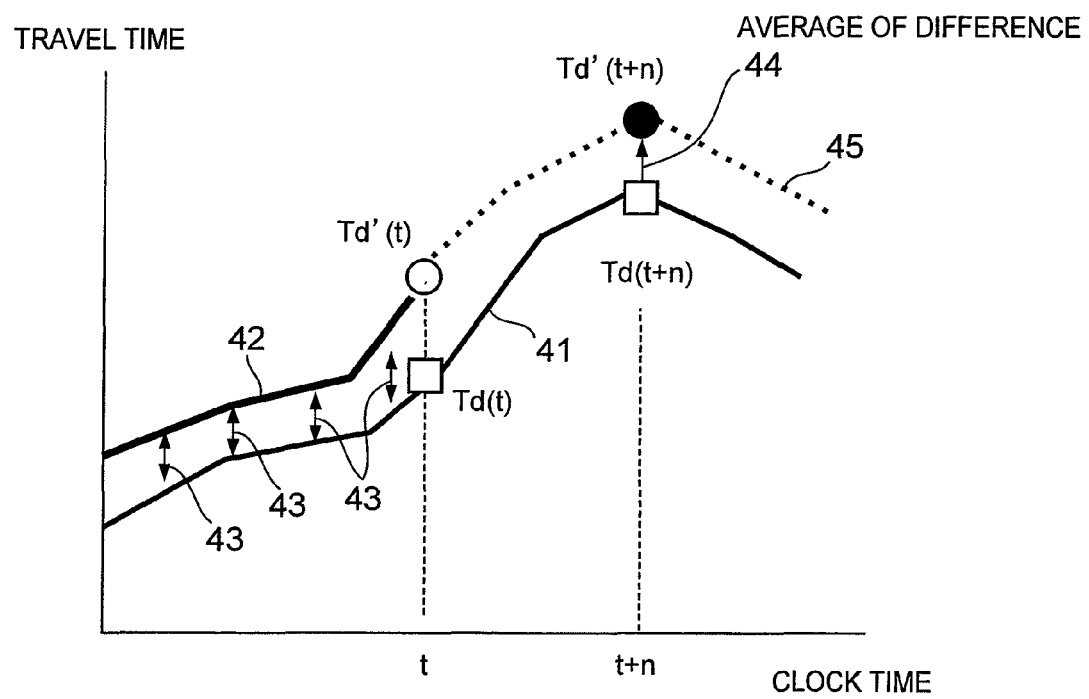
FIG. 3 is a chart to explain a method of how to generate the predicted traffic information.

Such predicted traffic information as described above can be generated based on the traffic information having been collected in the past. FIG. 3 shows an example of a method to generate the predicted traffic information.

In FIG. 3, reference numeral 41 represents a temporal change of travel time Td of a certain link, which has been obtained from the traffic information that was collected in the past. Reference numeral 42 represents a temporal change of travel time Td' of the pertinent link, which is obtained from the current traffic information. Here, the current time is assumed as t.

Firstly, a difference 43 between the link travel time Td' 42 acquired from the current traffic information and the past link travel time Td 41 is obtained at predetermined intervals. Then, an average 44 of these obtained differences is calculated. The predicted travel time Td'(t+n) at the time of (t+n) can be obtained by Td(t+n)+(average of the differences).

It is to be noted that the predicted traffic information is not necessarily generated by the method as described above. Time-series data of a past date and time-series data of the present date are compared, and data having similarity therebetween may be utilized to generate the predicted traffic information.

Figure 4:
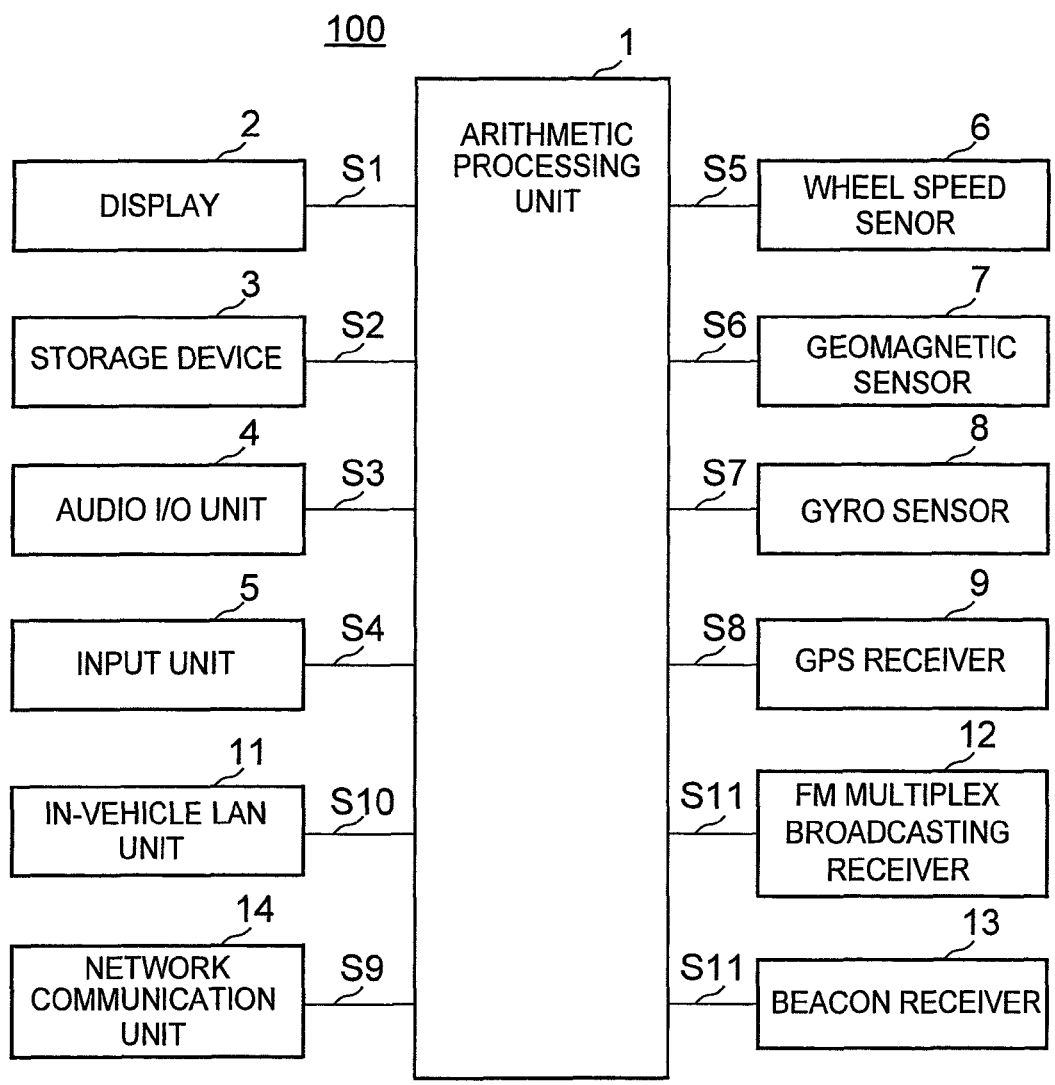
FIG. 4 is a schematic configuration diagram of an in-vehicle type navigation device 100.

FIG. 4 is a schematic configuration diagram of the in-vehicle type navigation device 100. As illustrated, the in-vehicle type navigation device 100 includes an arithmetic processing unit 1, a display 2, a storage device 3, an audio I/O unit 4, an input unit 5, a wheel speed sensor 6, a geomagnetic sensor 7, a gyro sensor 8, a GPS (Global Positioning System) receiver 9, an in-vehicle LAN unit 11, an FM multiplex broadcasting receiver 12, a beacon receiver 13, and a network communication unit 14.

The arithmetic processing unit 1 is a central unit that performs various processing. By way of example, the arithmetic processing unit 1 detects current position based on the information outputted from the various sensors 6 to 8, and the GPS receiver 9. On the basis of the current position information being obtained, the arithmetic processing unit 1 reads map data necessary for displaying, from the storage device 3. The arithmetic processing unit 1 graphically develops the map data being read, and displays the map on the display 2, so as to superimpose a mark representing the current position thereon. In addition, by the use of the map data stored in the storage device 3 and the time-series traffic information received from the traffic information distribution server 200, the arithmetic processing unit 1 finds an optimum route (recommended route) that links the current position (departure point) and a destination specified by the user. In addition, the arithmetic processing unit 1 guides the user, by using the audio I/O unit 4 and the display 2.

The display 2 is a unit to display graphics information generated by the arithmetic processing unit 1. The display 2 is made up of a CRT, a liquid crystal display, or the like. A signal S1 is generally an RGB signal, NTSC (National Television System Committee) signal, or the like, and it is used for connecting between the arithmetic processing unit 1 and the display 2.

The storage device 3 incorporates a storage medium such as a CD-ROM, a DVD-ROM, an HDD, and an IC card. This storage medium stores map data 310.

Figure 5:
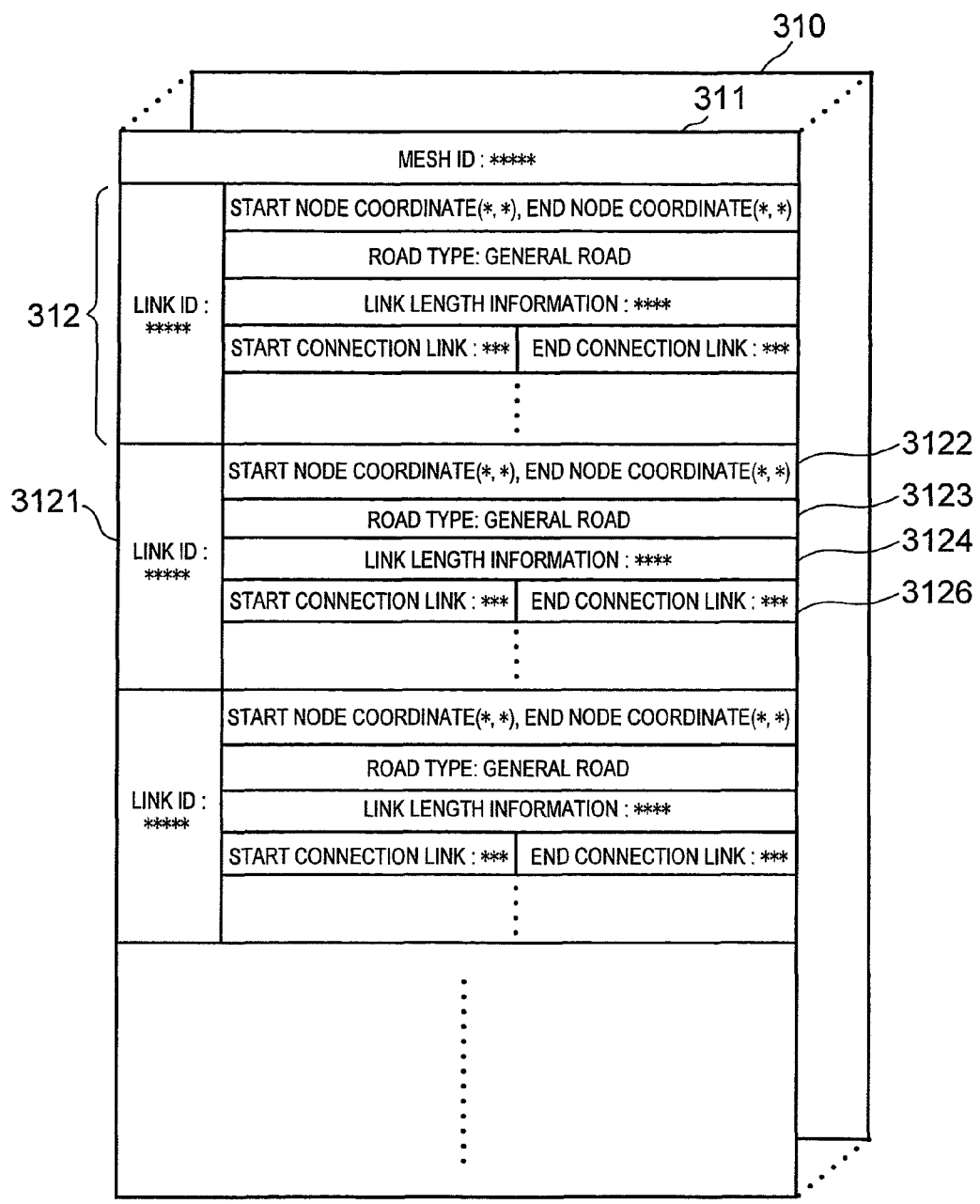
FIG. 5 illustrates a configuration of map data that is stored in a storage device 3.

FIG. 5 illustrates a configuration of the map data 310. The map data 310 includes link data 312 of each of the links that constitute roads contained in the mesh area, with respect to each mesh ID 311.

The link data 312 includes, with respect to each link ID 3121, coordinate information 3122 of two nodes (start node and end node) that constitute a link, type information 3123 of a road including the link, link length information 3124 indicating the length of the link, a link ID (connection link ID) 3126 of the link that is connected to each of the two nodes, and the like. Here, it is to be noted that as to the two nodes constituting the link, the start node and the end node are distinguished from each other, whereby inbound and outbound directions of the same road are managed as different links. In addition, the map data 310 further includes information (such as name, type, and coordinate information) of map constituent elements other than the roads, which are included in the associated mesh area.

In addition, the storage device 3 further stores a time band range table 350, and time band range decision tables 360, 370, 375, 380, and 385. These tables 350, 360, 370, 375, 380, and 385 are used in deciding a range of the predicted traffic information to be downloaded, as described below.

FIG. 6 is a configuration example of the time band range table 350. Using a certain clock time as a reference, the time band table 350 includes a time range before the clock time (time period before the reference time) 352 and a time range after the clock time (time period after the reference time) 353, with respect to each identification code of the time band range (time band range ID) 351.

In the present embodiment, there are five types of time band range decision tables 360, 370, 375, 380, and 385.

FIG. 7 is a configuration example of the time band range decision table 360. The time band range decision table 360 stores a distance from the current position 361 and the time band range ID 362, which are associated with each other. In the example in FIG. 7, the time band range ID 362 is assigned so that the larger the distance 361 from the current position, the larger the time band range (time range of the predicted traffic information to be downloaded as described below).

FIG. 8 is a configuration example of the time band range decision table 370. The time band range decision table 370 stores date and time (time band) 371 and the time band range ID 372, which are associated with each other. In the example of FIG. 8, the time band range ID 372 is assigned so that in peak periods of commuting, such as morning and evening, the time band range (time range of the predicted traffic information to be downloaded as described below) is set to be larger than that of midnight or early morning periods. The time band range ID is assigned as such, because it is considered that the traffic information rarely changes in the periods of midnight and early morning.

FIG. 9 is a configuration example of the time band range decision table 375. The time band range decision table 375 stores an area 376 and the time band range ID 377, which are associated with each other. In the example of FIG. 9, the time band range ID 377 is assigned so that in an urban area, the time band range (time range of the predicted traffic information to be downloaded as described below) is set to be larger than that in a rural area.

FIG. 10 is a configuration example of the time band range decision table 380. The time band range decision table 380 stores a difference between the current time and a departure time 381, and the time band range ID 382, which are associated with each other. In the example of FIG. 10, the time band range ID 382 is assigned so that the larger the difference between the current time and the departure time, the larger the time band range (time range of the predicted traffic information to be downloaded as described below).

FIG. 11 is a configuration example of the time band range decision table 385. The time band range decision table 385 stores a route searching condition 386 and the time band range ID 387, which are associated with each other. In the example of FIG. 11, the time band range ID 387 is assigned so that under the searching condition of placing priority on a toll road, the time band range (time range of the predicted traffic information to be downloaded as described below) is set to be narrower than that under the searching condition of placing priority on a general road. The time band range ID is assigned as such, because it is considered that a possibility of traffic congestion is lower on the toll road than the general road, and therefore there is less deviation in time on the toll road.

Processes for deciding a range of the predicted traffic information to be downloaded referring to those table 350, 360, 370, 375, 380 will be described below.

It is to be noted that the storage device 3 stores a first conversion table, which is a conversion table to specify, based on coordinate information, a mesh ID of a mesh area including a point identified by the coordinate information.

Explanations are continued, returning to FIG. 4. The audio I/O unit 4 converts a message generated for the user in the arithmetic processing unit 1, into an audio signal. In addition, the audio I/O unit 4 further performs processing to recognize a voice produced by the user, and to transfer the contents thereof to the arithmetic processing unit 1.

The input unit 5 is a unit for accepting a directive from the user. The input unit 5 is made up of hard switches such as a scroll key and a scale change key, a joystick, and a touch panel placed on the display.

The sensors 6 to 8 and the GPS receiver 9 are used by the in-vehicle type navigation device 100 to detect a current position (own vehicle position). The wheel speed sensor 6 measures distance by the product of wheel circumference and the number of revolutions thereof being measured, and further measures an angle at which the moving object has made a turn, based on difference in the number of revolutions of wheel pairs. The geomagnetic sensor 7 senses the earth's magnetic field, and detects a direction in which the moving object is facing. The gyro 8 is made up of an optical fiber gyro, a vibration gyro, or the like, and it detects the angle at which the moving object has turned. The GPS receiver 9 receives a signal from a GPS satellite to measure distance between the moving object and the GPS satellite, and a change rate of the distance, and this measurement is performed with regard to three or more GPS satellites, thereby measuring current position, travel speed, and travel azimuth of the moving object.

The in-vehicle LAN unit 11 receives various kinds of information regarding a vehicle on which the in-vehicle type navigation device 100 is mounted. The various kinds of information may include, for example, door open/close information, light ON/OFF state information, engine state, a result of failure diagnosis, and so on.

The FM multiplex broadcasting receiver 12 receives general current traffic data, traffic regulation information, and weather information, transmitted in a form of FM multiplex broadcasting signal from an FM multiplex broadcasting station.

The beacon receiver 13 receives current traffic data including link travel time that is transmitted from the beacon.

The network communication unit 14 intermediates sending and receiving of information between the in-vehicle type navigation device 100 and the traffic information distribution server 200. In addition, the network communication unit 14 accesses the traffic information distribution server 200, and receives current traffic information and predicted traffic information, periodically or upon conducting a route search.

Figure 12:
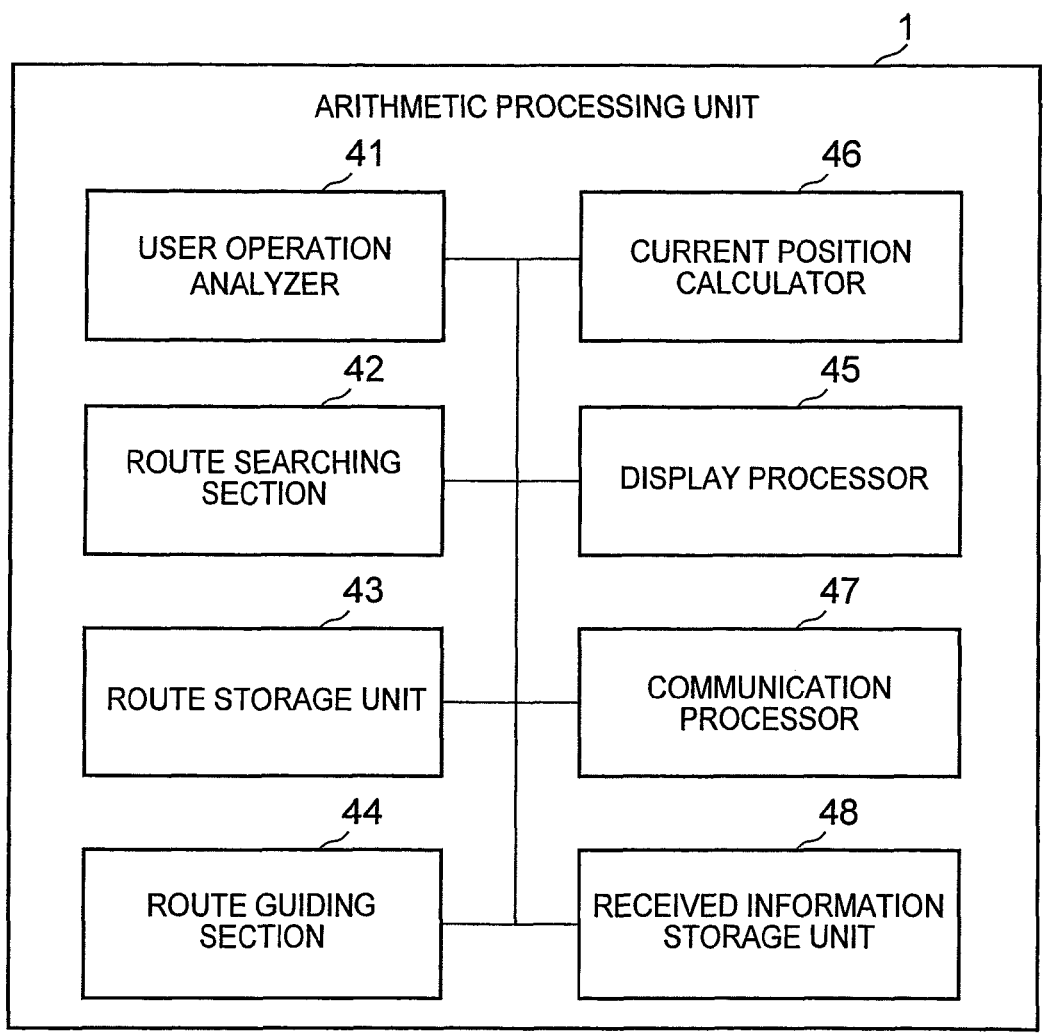
FIG. 12 illustrates a functional configuration of an arithmetic processing unit 1.

FIG. 12 illustrates a functional configuration of the arithmetic processing unit 1.

As illustrated, the arithmetic processing unit 1 includes a user operation analyzer 41, a route searching section 42, a route storage unit 43, a route guiding section 44, a current position calculator 46, a display processor 45, a communication processor 47, and a received information storage unit 48.

The current position calculator 46 utilizes distance data and angular data, which are obtained by integrating each of the distance pulse data S5 measured by the wheel speed sensor 6 and the angular acceleration data S7 measured by the gyro 8, and periodically calculates the current position (X', Y' by integrating the distance data and the angular data on a time axis. The current position (X', Y') is a position after the vehicle itself has traveled from the initial positions (X, Y). In addition, a map matching process is performed by the use of a result of the calculation, thereby fitting the current position into a road (link) having the highest correlation in shape.

The user operation analyzer 41 receives a request from the user inputted into the input unit 5, analyzes the content of the request, and controls each element in the arithmetic processing unit 1 so that processing responding to the request content is executed. By way of example, when the user requests a search to be made for a recommended route, the user operation analyzer 41 requests the display processor 45 to perform processing to display a map on the display 2, so that the user is allowed to set a destination. The user operation analyzer 41 further requests the route searching section 42 to perform processing to calculate a route from the current position (departure place) to the destination.

The route searching section 42 makes a search for a route that achieves the minimum cost (for example, travel time), out of routes connecting two specified points (the current position and the destination), by the use of the Dijkstra method or the like. The route storage unit 43 stores the route information that is searched by the route searching section 42.

The route guiding section 44 performs route guidance, utilizing the route thus searched by the route searching section 42. By way of example, the route guiding section 44 compares the route information with the current position information, and gives the user audio information as to whether the user should go straight or turn to the right or left, before passing a crossing, by using the audio I/O unit 4. In addition, the route guiding section 44 displays direction for proceeding on the map being displayed on the display 2, and notifies the user of a recommended route.

The display processor 45 receives, from the storage device 3, map data of an area that is requested to be displayed on the display 2, and generates a map drawing command so that a road, other map constituents, current position, a destination, and a mark such as an arrow for guiding along a route are drawn at a designated scale and in designated drawing mode. Then, the display processor 45 transmits the generated command to the display 2.

The communication processor 47 establishes a connection with the traffic information distribution server 200 by way of the network communication unit 14, upon accepting a request for downloading current traffic information and/or predicted traffic information, and requests downloading the current traffic information and/or the predicted traffic information. Then, the communication processor 47 stores the current traffic information and/or the predicted traffic information that have been downloaded to the received information storage unit 48. In addition, upon receipt of the current traffic information and/or the predicted traffic information via the FM multiplex broadcasting receiver 12 and the beacon receiver 13, the communication processor 47 stores the received information in the received information storage unit 48.

It is to be noted that if the storage device 3 is made up of a rewritable HDD, flash ROM and the like, the communication processor 47 may store the received information such as the current traffic information and the predicted traffic information in the storage device 3.

Figure 13:
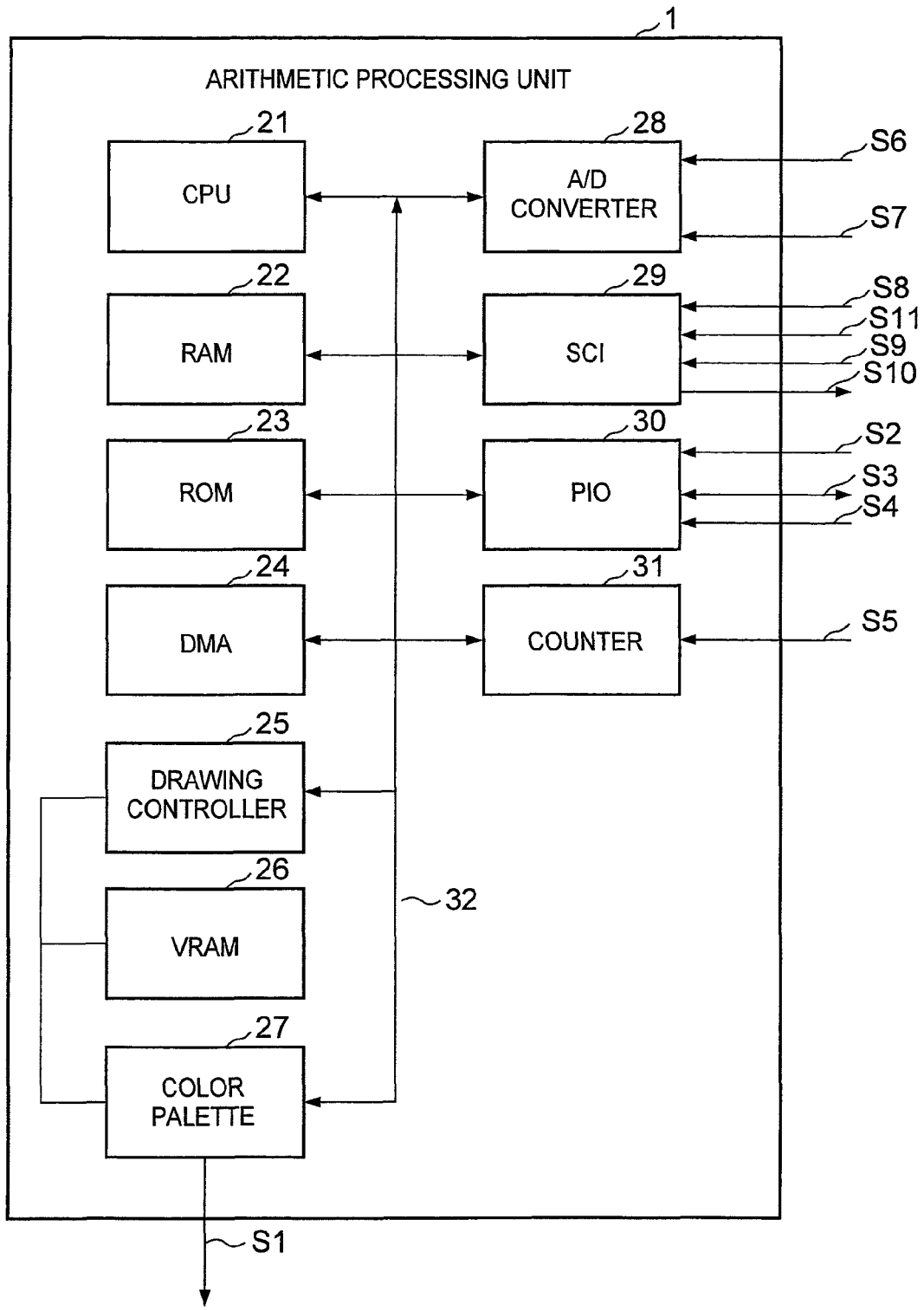
FIG. 13 illustrates a hardware configuration of the arithmetic processing unit 1.

FIG. 13 illustrates a hardware configuration example of the arithmetic processing unit 1.

As illustrated, the arithmetic processing unit 1 has a structure such that various units are connected to one another through a bus 32. The arithmetic processing unit 1 includes a CPU (Central Processing Unit) 21 which performs various processing such as controlling the numerical calculation and each unit, a RAM (Random Access Memory) 22 which stores map data and calculation data which are read from the storage device 3, a ROM (Read Only Memory) 23 which stores programs and data, a DMA (Direct Memory Access) 24 which performs data transmission between memories and between each memory and each unit, a drawing controller 25 which performs graphics drawing and also performs display control, a VRAM (Video Random Access Memory) 26 which stores graphics image data, a color pallet 27 which converts image data to RGB signals, an A/D converter 28 which converts analog signals to digital signals, a SCI (Serial Communication Interface) 29 which converts serial signals to parallel signals which are synchronized with the bus, a PIO (Parallel Input/Output) 30 which inputs the parallel signals on the bus in synchronism with the bus, and a counter 31 which integrates pulse signals.

Explanation of Operations

Figure 14:
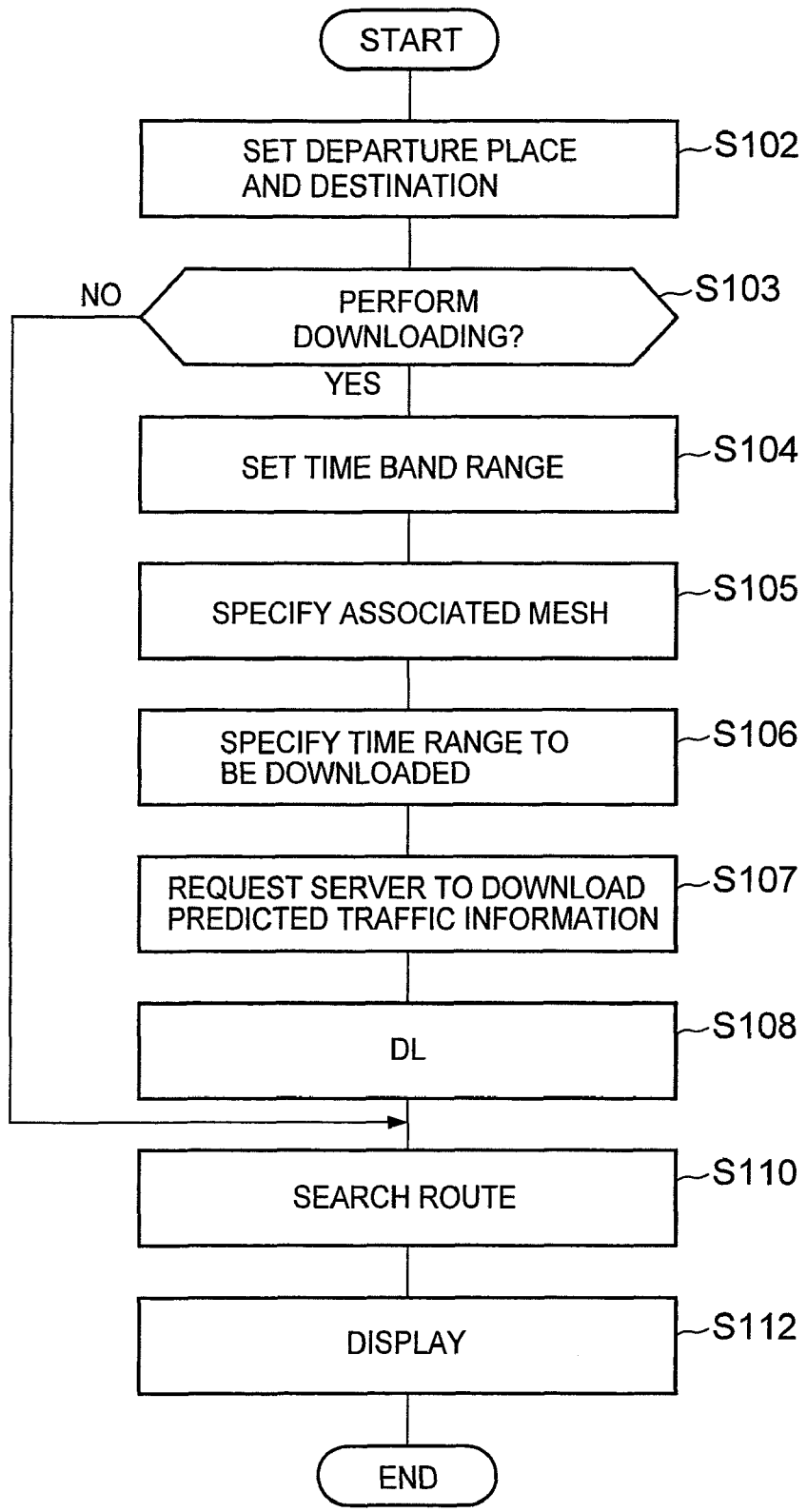
FIG. 14 is a flow diagram showing an outline of processing of the in-vehicle type navigation device 100.

Next, an operation of the in-vehicle type navigation device 100 will be explained. FIG. 14 is a flow diagram schematically showing an operation of the in-vehicle type navigation device 100 according to the present embodiment.

The flow starts when the user operation analyzer 41 receives a user's request to make a search for a recommended route, via the audio I/O unit 4 or the input unit 5.

Firstly, the user operation analyzer 41 sets a departure place and a destination. Generally, the user operation analyzer 41 sets the current position obtained by the current position calculator 46 as the departure place. The user operation analyzer 41 sets the destination according to a directive from the user. For example, the user operation analyzer 41 reads map component elements registered in the map data from the storage device 3. The user operation analyzer 41 displays those map component elements on the display 2 via the display processor 45. The user operation analyzer 41 allows the user to select the destination from the information of the map component elements being displayed, via the input unit 5. The user operation analyzer 41 further sets a departure time. If the current time is set as the departure time, the current time being obtained upon receipt of the search request for a recommended route is set as the departure time, by using a built-in timer that is not illustrated (S102).

Figure 15:
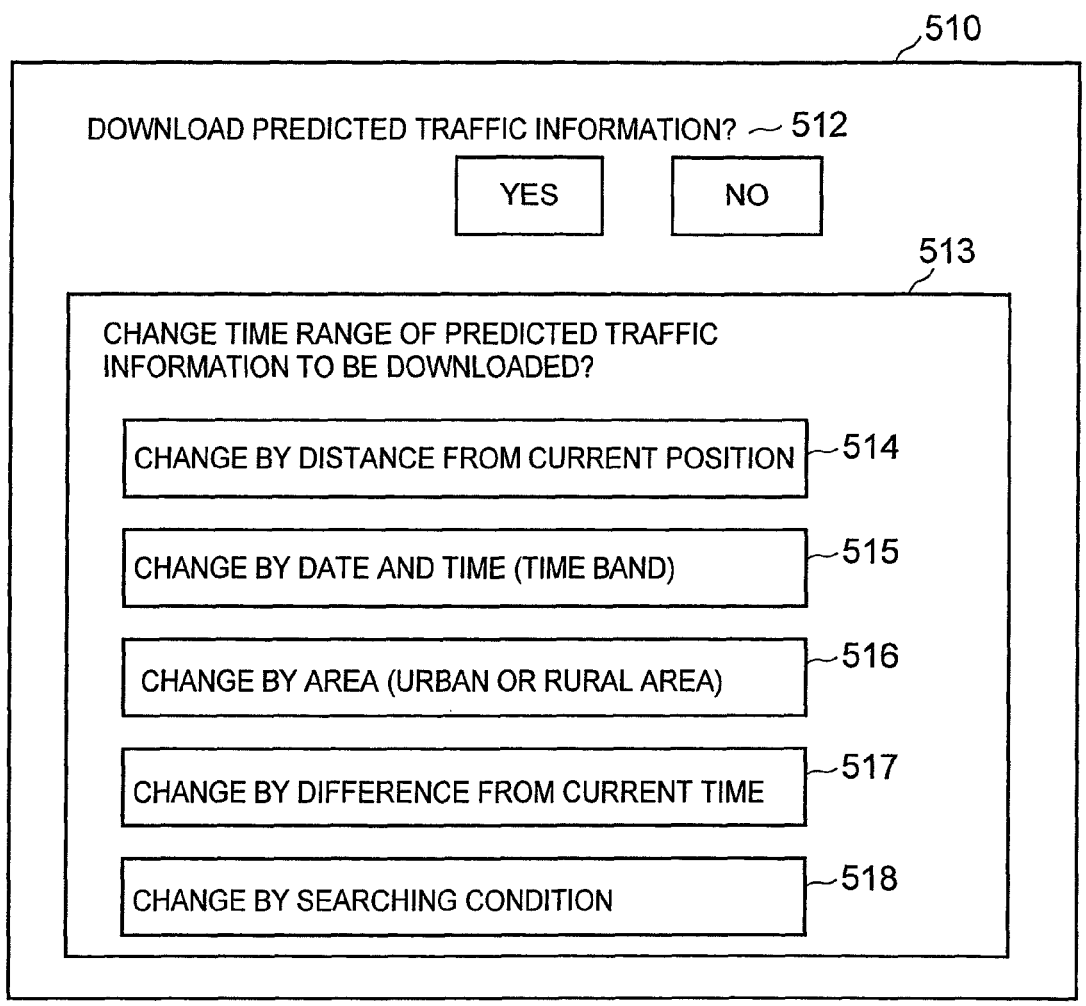
FIG. 15 is a display example showing a setting screen.

Next, the route searching section 42 accepts a directive as to whether or not predicted traffic information is to be downloaded (S103). On this occasion, as shown in FIG. 15, the display processor 45 displays a download setting screen 510. On the download setting screen 510, there are displayed buttons 512 that accept whether or not the predicted traffic information is to be downloaded, and it is possible to accept a directive from the user via the input unit 5. If a directive to perform downloading is not accepted, the route searching section 42 shifts the processing to S110, and performs route searching by using the predicted traffic information and/or the current traffic information that has been downloaded in the past and accumulated in the received information storage unit 48.

On the other hand, if a directive to perform downloading is accepted, the route searching section 42 configures the settings as to change of time range of the predicted traffic information to be downloaded. On this occasion, as shown in FIG. 15, the display processor 45 displays a setting screen 513 regarding the change of time range of the predicted traffic information to be downloaded.

In the present embodiment, there are five modes as to the change of time range. On the screen 513, there are options 514 to 518 to select any one of the modes: "change by distance from the current position", "change by date and time", "change by area", "change by difference from the current time", and "change by route searching condition".

The route searching section 42 performs the following processing according to a mode selected via the input unit 5 from the user (S104). It is alternatively possible to skip the process for selecting how to change the time range of the predicted traffic information to be downloaded, if it is preset how to change the time range, or there is a request from the user to hold the previous setting. With the procedure above, it is possible to omit the setting operation every time the route searching is performed.

Next, the route searching section 42 specifies a mesh (associated mesh) that is associated with a route from the departure place to the destination (S105). Specifically, the route searching section 42 uses the map data, and makes a search for a route to achieve a minimum total cost, assuming a link length (or link travel time obtained from the link length based on a predetermined speed) as a cost. It is to be noted that if a route from the same departure place to the same destination has already been searched out and stored in the route storage unit 43, this route may be used, and it is not necessary to make a search for a new route.

If the route has not been searched for yet, a mesh surrounding the current position (for example, within a 20 kilometer radius of the current position) may be assumed as an associated mesh.

Figures 16, 17:
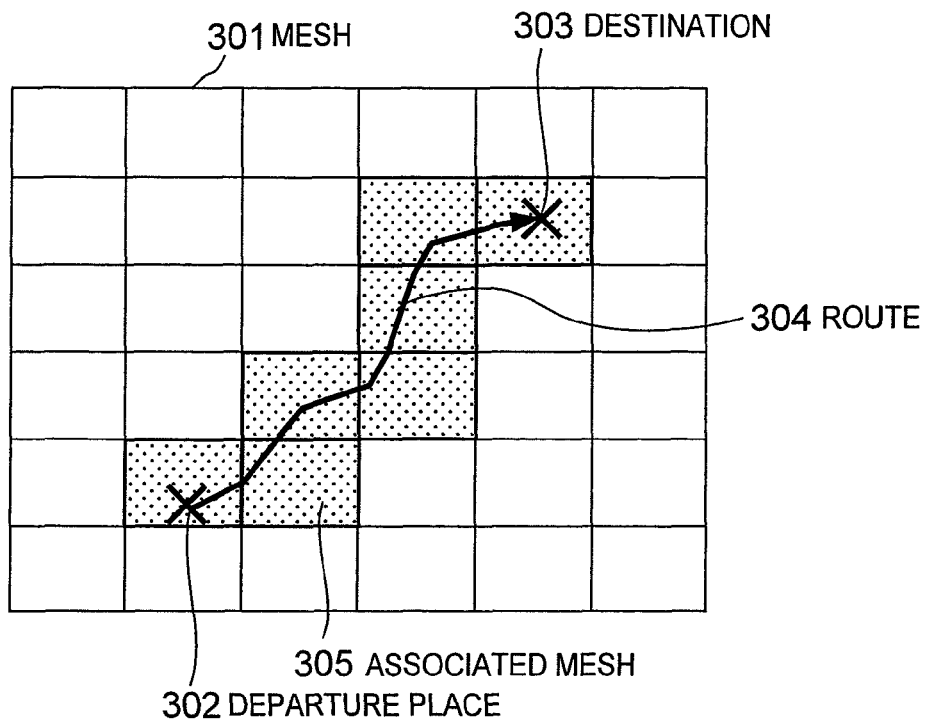
FIG. 16 is an illustration to explain how an associated mesh is specified from a route.
FIG. 17 is a configuration example of download request information.

Next, as shown in FIG. 16, by using the map data, a mesh 305 including a link constituting a route 304 from the departure place 302 to the destination 305 is specified. In FIG. 16, reference numeral 301 represents a mesh obtained by partitioning the map, and numeral 305 represents an associated mesh.

When the associated mesh is specified, the route searching section 42 determines, with respect to each associated mesh, a time range of the predicted traffic information to be downloaded (S106). Specifically, the route searching section 42 conducts the following procedure according to a mode that is preset for each mesh.

(1) Firstly, the mode "change by distance from the current position" will be explained. The route searching section 42 obtains an estimated arrival time with respect to each associated mesh. The estimated arrival time can be obtained by a distance from the current position to a representative point (e.g., a central point) of the mesh and searching conditions. By way of example, the distance from the current position to the mesh representative point (e.g., the central point) is divided by a predetermined speed, thereby estimating a required travel time. This estimated required travel time is added to the departure time, and an obtained value is assumed as the estimated arrival time at the mesh.

Next, the route searching section 42 refers to the time band range decision table 360, and specifies a time band range ID 362 associated with the distance 361 from the departure place (current position) to the associated mesh. Next, according to the time band range table 350, the route searching section 42 specifies the "time period before the reference time" 352 and the "time period after the reference time" 353, being associated with the time band range ID 351 that is the same as the time band range ID 362 that was specified previously. Then, assuming the estimated arrival time at each mesh as reference time, a time range of predicted traffic information to be downloaded is decided, and as shown in FIG. 17, download request information 390 is generated. Specifically, one record of the download request information 390 is generated with respect to each associated mesh. Then, a mesh ID of the associated mesh is stored as the mesh ID 391 for each record. In addition, the time range 392 is stored, assuming a clock time obtained by subtracting the "time period before the reference time" from the expected arrival time at the mesh as an earlier limit, and a clock time obtained by adding the "time period after the reference time" to the estimated arrival time at the mesh as a later limit. In the present embodiment, according to the configurations as shown in FIG. 6 and FIG. 7, the time range becomes larger, as the distance from the current position becomes longer.

According to the procedures as described above, the time ranges of the predicted traffic information to be downloaded are determined respectively for all the associated meshes, and the download request information 390 is generated. It is to be noted here that the download request information 390 is stored once in memory.

(2) Next, the mode "change by date and time" will be explained. The route searching section 42 obtains an estimated arrival time with respect to each mesh, as described above.

The route searching section 42 uses the time band range decision table 370 and specifies a time band range ID 372 associated with the date and time to which the current time belongs. When the time band range ID is specified, by the use of the time band range table 350 as described above, the time range of the predicted traffic information to be downloaded is determined. In the present embodiment, according to the configurations as shown in FIG. 6 and FIG. 8, the time range of peak periods of commuting such as morning and evening becomes larger, compared to the periods of midnight and early morning.

It is to be noted that the "date and time" 371 in specifying the time band range ID 372 may not necessarily be the date and time corresponding to the current time. The date and time may correspond to a departure time or a downloading time, in response to a request from the user.

(3) Next, the mode "change by area" will be explained. Here, it is assumed that the map data may include information indicating which area (urban area, rural area, and the like) each mesh belongs to. The route searching section 42 obtains an estimated arrival time with respect to each mesh as described above.

The route searching section 42 uses the time band range decision table 375 and specifies a time band range ID 377 associated with the area to which the associated mesh belongs. When the time band range ID is specified, by the use of the time band range table 350 as described above, a time range of the predicted traffic information to be downloaded is determined. In the present embodiment, according to the configurations as shown in FIG. 6 and FIG. 9, the time range in the urban area becomes larger compared to the rural area.

(4) Next, the mode "change by difference from the current time" will be explained. The route searching section 42 obtains an estimated arrival time with respect to each mesh.

The route searching section 42 uses the time band range decision table 380, and specifies a time band range ID 382 associated with a difference between the current time (downloading time) and the departure time. When the time band range ID is specified, by the use of the time band range table 350 as described above, the time range of the predicted traffic information to be downloaded is determined.

In the present embodiment, according to the configurations as shown in FIG. 6 and FIG. 10, the time range becomes larger, as a difference between the current time (downloading time) and the departure time becomes larger.

The time range of the predicted traffic information to be downloaded may be varied, according to the difference between the current time (downloading time) and a scheduled arrival time at the destination. In the case above, an input from the user as to a desired arrival time is accepted, and it is assumed as a scheduled arrival time. Then, difference from the current time is obtained. Alternatively, the difference from the current time is obtained by using an estimated arrival time at the destination, which has been obtained by the route searching previously performed. The time band range decision table to be used here may have a configuration similar to the table shown in FIG. 10. With the configuration above, it is possible to obtain necessary predicted traffic information, giving consideration to a rest time along the way.

(5) Next, the mode "change by route searching condition" will be explained. Here, it is assumed that route searching conditions such as "toll road priority" and "general road priority" are preset in accordance with a request from the user. The route searching section 42 obtains an estimated arrival time with respect to each mesh, as described above.

The route searching section 42 uses the time band range decision table 385, and specifies a time band range ID 387 associated with the route searching condition 386. When the time band range ID is specified, by using the time band range table 350 as described above, the time range of the predicted traffic information to be downloaded is determined. In the present embodiment, according to the configurations as shown in FIG. 6 and FIG. 11, the time range becomes narrower in the case where the search condition is "toll road priority", compared to the case where the condition is "general road priority".

Explanations have been made so far regarding how to determine the time range of the predicted traffic information to be downloaded in each of the modes.

Next, the route searching section 42 directs the communication processor 47 to download the predicted traffic information. On receipt of this directive, the communication processor 47 transmits the download request information 390 to the traffic information distribution server 200. Then, the communication processor 47 requests the traffic information distribution server 200 to transmit the predicted traffic information (S107).

On receipt of this request, the traffic information distribution server 200 extracts from the predicted traffic information 210 stored in its own storage unit, the predicted traffic information within the range specified by the download request information 390. Specifically, the traffic information distribution server 200 extracts from the predicted traffic information 210, predicted traffic information (link travel time 214 and traffic congestion information 215 associated with the link ID 213) having the mesh ID 211 corresponding to the mesh ID 391 included in the download request information 390, and within the time band 212 included in the time band 392. Then, the predicted traffic information being extracted is transmitted to the in-vehicle type navigation device 100.

It is to be noted that if there is no change in the predicted traffic information within one or more time bands, the traffic information distribution server 200 transmits only the predicted traffic information of one of the time bands. In addition, the information, indicating that there is no change in the predicted traffic information within these multiple time bands, is transmitted to the in-vehicle type navigation device 100. In the case above, the in-vehicle type navigation device 100 uses the predicted traffic information within one time band as the information for multiple time bands.

The communication processor 47 of the in-vehicle type navigation device 100 receives the predicted traffic information from the traffic information distribution server 200, and stores the received information in the received information storage unit 48 (S108).

Next, the route searching section 42 performs the route searching by using the predicted traffic information, according the processing as described below (S110). Then, the route being searched out is displayed on the display 2 via the display processor 45 (S112).

Flow of the processing shown in FIG. 14 has been explained so far.

Figure 18:
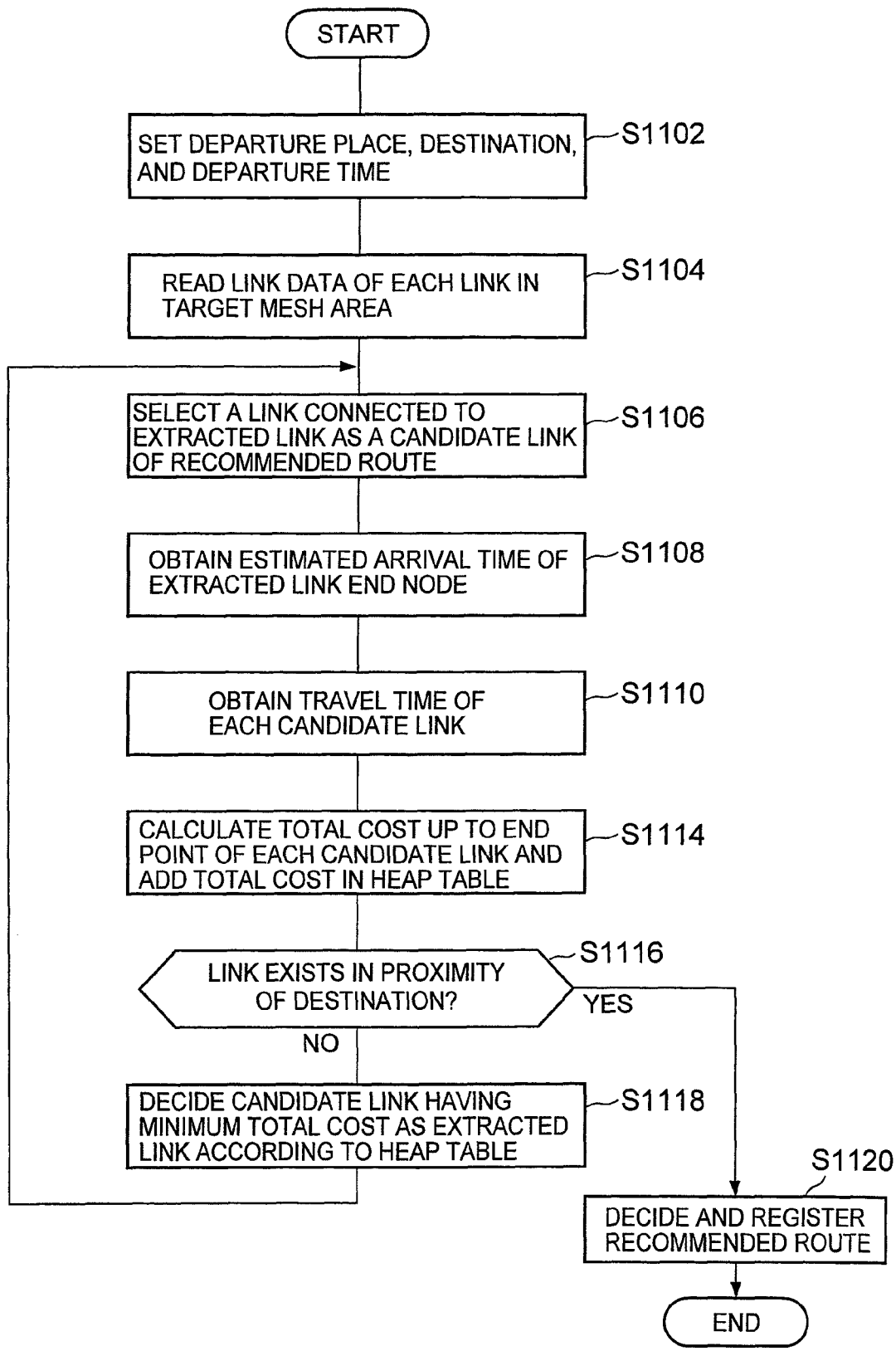
FIG. 18 is a flow diagram showing a process of S110 in FIG. 13.

Next, the route searching process (S110) will be explained specifically. FIG. 18 is a flow diagram showing the route searching process.

According to the coordinates of the current position, the route searching section 42 uses the first conversion table described above to specify a mesh ID of each of the mesh areas included in the route searching area containing the departure place and the destination (S1102).

In addition, the route searching section 42 obtains, from the storage device 3, each link data 312 registered in each item of map data 310 having the specified mesh ID (S1104).

Next, the route searching section 42 uses the link data 312 read from the storage device 3 in S1104 and selects a link as a candidate of the link constituting the recommended route (referred to as "candidate link"). An end node of the link extracted from the heap table in S1118 described below (referred to as "extracted link") serves as a start node of the above selected link.

If the process in S1118 has not been performed, that is, in an initial stage where a link has not been registered in the heap table yet, at least one link in which the departure place exists, or which is in proximity to the departure place is selected as the candidate link, instead of selecting a link having the end node of the extracted link as a start node (S1106).

Figures 19, 20:
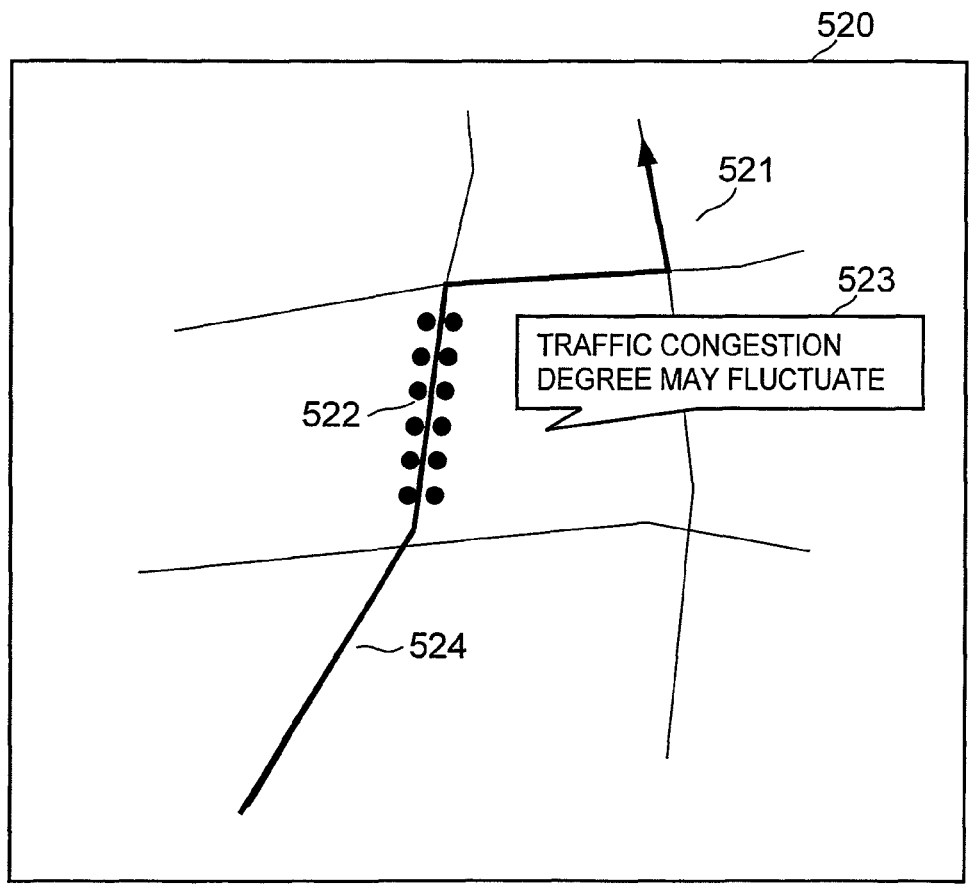
FIG. 19 illustrates a configuration of a heap table that is used in route searching.
FIG. 20 is a display example showing a route and a degree of traffic congestion.

It is to be noted here that the heap table is a table to register the link data of a candidate link together with total cost from the departure place to the end node of the candidate link, and this table is stored in a storage unit, such as a memory. FIG. 19 illustrates one example of the heap table. As is shown, the heap table registers a record 4300 with respect to each candidate link. The record 4300 includes a field 4301 to register a link ID of the candidate link, a field 4302 to register a cost (travel time) of the candidate link, a field 4303 to register a link ID of connection source link, the end node of which is connected to the start node of the candidate link, a field 4304 to register a total cost (total travel time) from the departure place to the candidate link, a field 4306 to register an extraction flag indicating whether or not the candidate link has already been set as an extracted link in S1118 described below.

Next, the route searching section 42 calculates an estimated arrival time at the end node of the extracted link. This is calculated by specifying the record 4300 of the candidate link currently set as the extracted link, and adding the total travel time registered in the field 4304 of the record to the departure time (S1108).

Then, the route searching section 42 specifies a record including the candidate link, with respect to each candidate link, from the predicted traffic information stored in the received information storage unit. In addition, a link travel time of the time band (focused time band) to which the estimated arrival time belongs is identified based on the specified record. (S1110).

If the estimated traffic information does not contain a record including the candidate link, or even though such record is contained, a link travel time of the candidate link within the focused time band is not included and the link travel time cannot be extracted, the route searching section 42 sets the link travel time obtained from the link data 312 (a value obtained by dividing the link length by a predetermined moving velocity, e.g., 40 kilometers per hour) as a link travel time of the candidate link. If the storage device 3 stores statistical traffic information generated by statistically processing the past traffic information, and the statistical traffic information includes the link travel time of the candidate link, this link travel time may be assumed as the travel time of the candidate link.

Next, the route searching section 42 calculates a total travel time (total cost) from the departure place to the candidate link, with respect to each candidate link. Specifically, a travel time of the candidate link within the focused time band, obtained in S1110, is added to the total travel time of the extracted link registered in the heap table, and the result of the addition is assumed as the total travel time of the candidate link. Then, the route searching section 42 adds a record 4300 of each candidate link to the heap table. The link ID of the corresponding candidate link, the travel time of the candidate link (cost), the link ID of extracted link (connection source link), and the total travel time (total cost) from the departure place to the candidate link are respectively registered in the fields 4301 to 4304 of each added record 4300. "Not yet" is registered in the field 4306, indicating that the record has not been set as an extracted link yet (S1114).

Next, the route searching section 42 checks whether or not there is a link in which the destination exists or which is in proximity with the destination (referred to as "destination link"), among the candidate links newly added to the heap table in the process in S1114, which is performed just before (S1116).

If it is determined in S1116 that no destination link exists, the route searching section 42 sorts the records 4300 of the candidate links registered in the heap table, by the total travel time in ascending order, and extracts a not-yet-extracted link having the minimum total travel time from the heap table, by processing such as extracting the not-yet-extracted link positioned in an uppermost rank among the candidate links that have the extraction flag "not yet" in the field 4306 (referred to as "not-yet-extracted link"). Then, the currently extracted link is replaced by this not-yet-extracted link, and the extraction flag registered in the field 4306 of the record 4300 is changed from "not-yet" to "already-set" (S1118). Then, the processing returns to S1106.

On the other hand, if it is determined in S1116 that there is a destination link, the route searching section 42 performs processing to decide the recommended route. Specifically, the route searching section searches the heap table for a connection source link of the destination link (a candidate link whose link ID is registered in the field 4303 of the record 4300 of the destination link), and the link being searched is decided as a link constituting the recommended route (referred to as "component link"). Next, it is determined whether or not there is a connection source link for the component link, and if there is a connection source link, this connection source link is decided as a component link. It is further checked whether or not there is a connection source link for the component link decided just before. The processing above is repeated until there is no more connection source link for the component link, that is, until the component link becomes a link where the departure place exists or is in proximity with the departure place (referred to as "departure link"), whereby each of the component links constituting the recommended route are decided. Then, the route searching section 42 stores in the route storage unit 43, as information of the recommended route, the link data 312 of each of the component links constituting the recommended route and the travel time obtained in S1110, together with the departure time information (S1120).

According to the processing above, the cost of each of the component links constituting the recommended route is calculated as in the following. In other words, the travel time obtained from the predicted traffic information corresponding to the time band that includes the departure time is set as a travel time of the first link constituting the recommended route. In addition, the travel time obtained from the predicted traffic information corresponding to the time band including the estimated arrival time at the end node of the (n−1)th link that is connected to the n-th link, is assumed as a travel time of the n-th link (n≧2) constituting the recommended route.

Flow of the route searching process has been explained in the above description. According to this flow, the route searching is performed by using the travel time of the predicted traffic information for the estimated arrival time of the link. Therefore, highly accurate route searching can be carried out.

The route being searched is displayed on the display 2 by the display processor 45.

FIG. 20 is an example that displays a route 524 on the map 521. On this occasion, it is further possible to display a traffic congestion degree included in the predicted traffic information. In addition, as for the link on which the traffic degree may change depending on the time band, it is possible to display a notice that the traffic congestion degree may fluctuate as indicated by the numeral 523. For example, such a link as described above may be displayed in a different manner 522, for example, by a different color compared to the other links, or may be made to blink.

One embodiment of the present invention has been explained so far.

According to the present embodiment, it is possible to download predicted traffic information for multiple time bands, for one mesh, by one downloading, and therefore establish efficient communication.

Since the predicted traffic information is obtained regarding multiple time bands in advance, if there is a need to perform the route searching once again, it is possible to perform searching, in consideration of the predicted traffic information, without re-downloading.

In addition, since the predicted traffic information that has a high possibility to be used in navigation processing, such as route searching, is downloaded, efficient communication can be achieved.

The present invention is not limited to the embodiment described above, and various modifications are possible.

In the present embodiment, the time range of the predicted traffic information to be downloaded is the same before and after a reference time (e.g., departure time), that is, symmetric with respect to the reference time, as shown in the time band range table 350 in FIG. 10. The present invention is not limited to the embodiment above. The time range before the reference time and after the reference time may be asymmetrical.

Figures 21, 22:
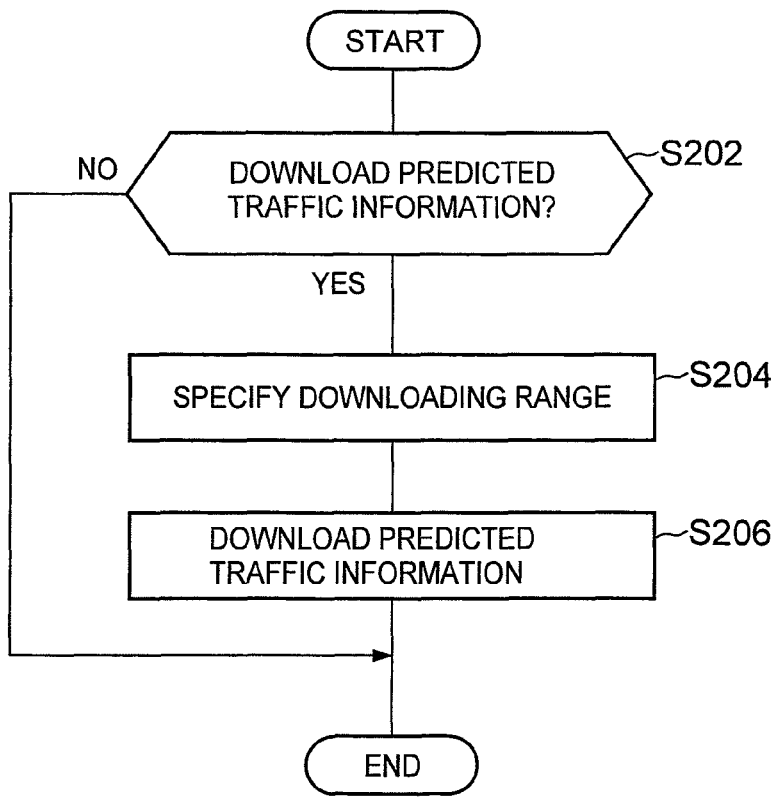
FIG. 21 is a configuration example of a time band range table.
FIG. 22 is a flow diagram showing a download process relating to a modified example.

By way of example, the time band range table 355 may be configured as shown in FIG. 21. In other words, the time range before the reference time 357 is narrower than the time range after the reference time 358.

In addition, a predetermined calculating formula may be used to determine the time range of the predicted traffic information to be downloaded, instead of using the table. For example, the time range of the predicted traffic information may be determined by an algorithm that is configured such that the time range becomes larger, as the distance from the current position becomes longer.

It is further possible to download the predicted traffic information simultaneously when the traffic information distribution server 200 is accessed such as when receiving the current traffic information. With the configuration above, it is possible to reduce negotiation frequencies for accessing, whereby downloading is performed efficiently and communication charges can be lowered.

Specifically, the predicted traffic information is downloaded according to the flow as shown in FIG. 22.

This flow starts when the communication processor 47 accepts a request to access the traffic information distribution server 200. Accessing the traffic information distribution server 200 is requested, for example, periodically or when receiving the current traffic information in response to a request from the user.

Figure 23:
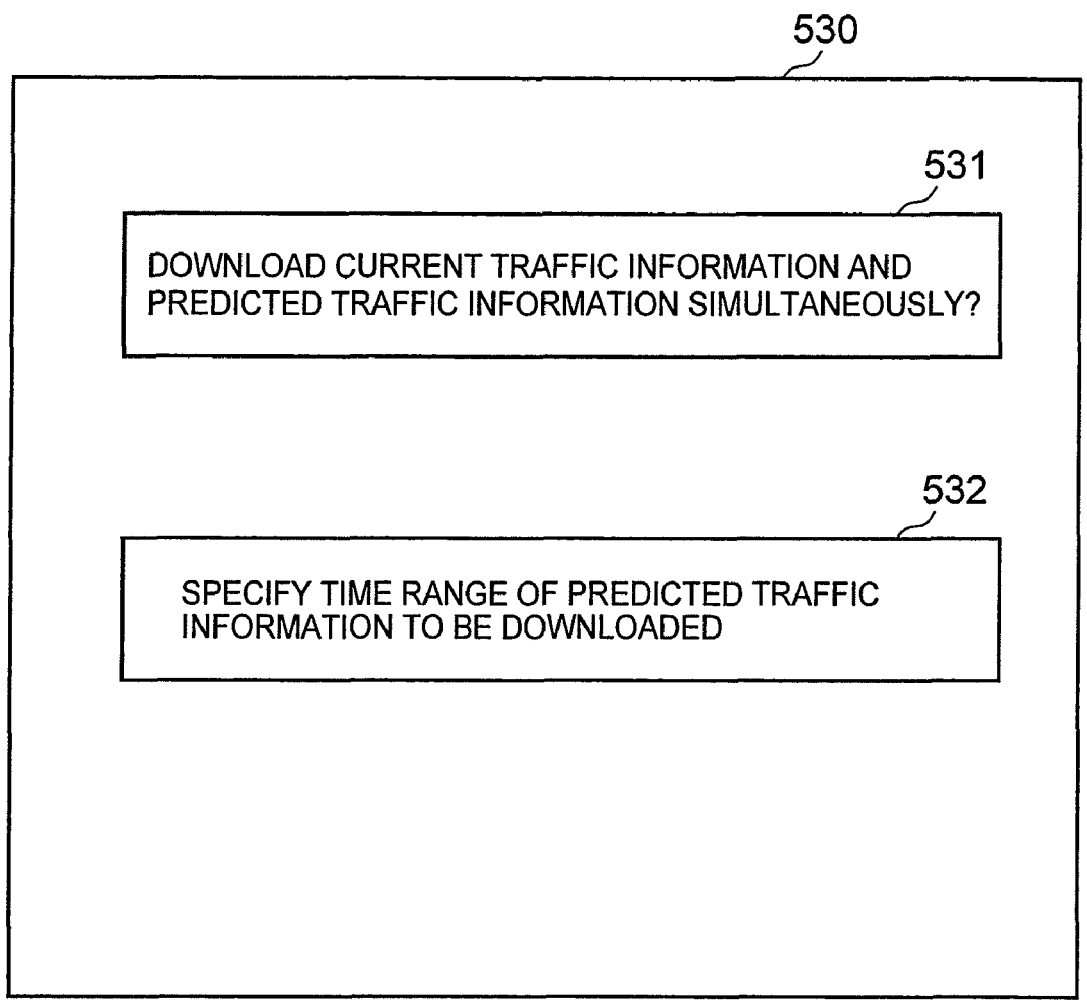
FIG. 23 is a display example showing a screen to accept a download request.

Firstly, the communication processor 47 accepts a directive as to whether or not the predicted traffic information is downloaded (S202). On this occasion, as shown in FIG. 23, the display processor 45 displays a screen 530 on the display 2, which accepts the directive as to whether or not the downloading is to be performed. If there is a directive from a user to download the predicted traffic information via the input unit 5, the communication processor 47 specifies a range of the predicted traffic information to be downloaded. This is specified according to the similar manner as shown in steps S105 and S106 in FIG. 14. If the route has not been searched yet, a mesh surrounding the current position (for example, within a 20 kilometer radius of the current position) may be assumed as an associated mesh.

If it is configured, in advance or in the previous setting, such that the predicted traffic information is to be downloaded, or a range for downloading is already determined, the downloading may be started without accepting a directive as to whether or not the downloading is to be performed, or a directive to determine the range for downloading.

After deciding the associated mesh and the time range of the predicted traffic information to be downloaded, and generating download request information 390, the communication processor 47 performs negotiations with the traffic information distribution server 200 for accessing, and thereafter transmits the download request information 390 and requests downloading of the predicted traffic information.

Then, the communication processor 47 receives from the traffic information distribution server 200, the predicted traffic information being downloaded in response to the download request and allows the received information storage unit 48 to store the information (S206).

According to the flow above, by utilizing the opportunity of accessing the traffic information distribution server 200 for other processing, the predicted traffic information can be downloaded, thereby reducing the total communication time.

It is further possible to accept from a user via the input unit, a range of the predicted traffic information (e.g., time range) to be downloaded, and generate download request information. In this case, a button to accept a setting of the time range may be displayed, just like the setting button 532 in FIG. 23.

It is further possible for the communication processor 47 to erase the predicted traffic information that has expired or to not use such information for the route searching process. Specifically, the communication processor 47 compares the expiration date of the predicted traffic information stored in the received information storage unit 48 with the current date and time. If the expiration date is over the current date and time, the communication processor 47 erases the predicted traffic information from the received information storage unit 48. Alternatively, such information may not be used for route searching.

In addition, when the predicted traffic information stored in the received information storage unit 48 is expired, the communication processor 47 may request the traffic information distribution server 200 to download the predicted traffic information.

A screen to accept a selection of actions for the case of expiration may be displayed, allowing the user to make a selection from the actions. Then, after the expiration of the predicted traffic information, the communication processor 47 allows the selected action to be performed. Examples of the actions may include, as described above, erasing the predicted traffic information from the received information storage unit 48, not using the information for the navigation process such as route searching, and starting downloading of the latest predicted traffic information.

If the current traffic information also has an expiration date, the communication processor 47 may manage the expiration date of the predicted traffic information, separately from the expiration date of the current traffic information. In other words, the communication processor 47 stores the expiration date of the predicted traffic information in the storage device 3, so as to be distinguished from the expiration date of the current traffic information. In the case above, the traffic information distribution server 200 transmits the current traffic information together with its expiration date, and transmits the predicted traffic information to the in-vehicle type navigation device 100 together with its expiration date.

In the embodiment above, the in-vehicle type navigation device 100 determines the range of the predicted traffic information to be downloaded. The present invention is not limited to the above embodiment. It is further possible for the traffic information distribution server 200 to decide a range of the predicted traffic information to be downloaded, by specifying an associated mesh and the time range. By way of example, upon accepting a setting of the destination, the in-vehicle type navigation device 100 transmits such information to the traffic information distribution server 200. Then, the traffic information distribution server 200 may conduct the route search, and determine the associated mesh and the time range of the predicted traffic information to be downloaded.

It is to be noted that the examples above have been explained for cases in which the present invention is applied to an in-vehicle type navigation device. However, the present invention may be applied to navigation devices other than the in-vehicle type.

What is claimed is:

1. A navigation device, comprising:
  a connection unit configured to establish connection with a traffic information distribution server that stores, for each of a plurality of mesh areas, which are partitioned areas in a map, predicted traffic information after a current time; and
  a download unit configured to download, from the traffic information distribution server, predicted traffic information for meshes within a mesh area; wherein:
  a time band of the predicted traffic information to be downloaded is associated with each of the meshes,
  each time band has a variable time band range, which is a duration of the time band within which the predicted traffic information is downloaded, and
  the time band range is determined as a function of predetermined conditions.

2. The navigation device according to claim 1, wherein time band range of the predicted traffic information to be downloaded is determined as a function of the character of an area in which an associated mesh is situated.

3. The navigation device according to claim 1, wherein the time band range is determined for a particular time band as a function of distance from current position to a mesh with which the particular time band is associated.

4. The navigation device according to claim 1, wherein the time band range is determined as a function of date and time of date.

5. The navigation device according to claim 1, wherein the time band range is determined as a function of a searching condition in route searching.

6. The navigation device according to claim 1, wherein the time band range is determined as a function of the magnitude of the difference between a downloading time and a scheduled departure time.

7. The navigation device according to claim 1, wherein the time band range is determined as a function of the magnitude of the difference between a downloading time and a scheduled arrival time.

* * * * *